(12) United States Patent
Toomre et al.

(10) Patent No.: US 8,519,715 B2
(45) Date of Patent: Aug. 27, 2013

(54) METHOD AND SYSTEM FOR ASSEMBLING A BATTERY MODULE

(75) Inventors: Erik Toomre, Los Altos, CA (US); Karsten Rueter, Landshut (DE); Guido Hofer, Weng (DE)

(73) Assignees: Volkswagen AG, Wolfsburg (DE); Audi AG, Ingolstadt (DE); Lisa Draexlmaier GmbH, Vilsbiburg (DE)

(*) Notice: Subject to any disclaimer, the term of this patent is extended or adjusted under 35 U.S.C. 154(b) by 373 days.

(21) Appl. No.: 13/009,450

(22) Filed: Jan. 19, 2011

(65) Prior Publication Data

US 2012/0133371 A1    May 31, 2012

Related U.S. Application Data

(60) Provisional application No. 61/417,668, filed on Nov. 29, 2010.

(51) Int. Cl.
*G01N 27/416* (2006.01)
*H01M 2/10* (2006.01)

(52) U.S. Cl.
USPC .................. 324/426; 324/434; 429/98

(58) Field of Classification Search
USPC .................. 324/426, 434; 429/98
See application file for complete search history.

(56) References Cited

U.S. PATENT DOCUMENTS

| | | | | |
|---|---|---|---|---|
| 5,187,423 | A * | 2/1993 | Marton | 320/109 |
| 5,415,047 | A * | 5/1995 | Maciejewski et al. | 73/850 |
| 5,631,536 | A * | 5/1997 | Tseng | 320/137 |
| 2010/0047686 | A1* | 2/2010 | Tsuchiya et al. | 429/178 |
| 2011/0014501 | A1* | 1/2011 | Scheucher | 429/7 |

* cited by examiner

*Primary Examiner* — M'Baye Diao
(74) *Attorney, Agent, or Firm* — Kenyon & Kenyon LLP

(57) ABSTRACT

A test fixture for testing a plurality of longitudinal battery cells includes: a base plate; a plurality of holding structures for holding the battery cells, the holding structures being mounted on the base plate and configured to hold the battery cells with their longitudinal axes being perpendicular with respect to the base plate; and a plurality of contacts arranged on the base plate to electrically contact positive and negative terminals of each of the battery cells.

23 Claims, 8 Drawing Sheets

METHOD AND SYSTEM FOR ASSEMBLING A BATTERY MODULE

CROSS-REFERENCE TO RELATED APPLICATIONS

The present application claims the benefit of U.S. Provisional Patent Application Ser. No. 61/417,668, filed on Nov. 29, 2010, which is expressly incorporated herein in its entirety by reference thereto.

FIELD OF THE INVENTION

The present invention relates to a test fixture for testing a plurality of battery cells, an effector for engaging and disengaging a plurality of battery cells, a system for assembling a battery module, and a method for manufacturing a battery module.

SUMMARY

According to example embodiments of the present invention, a test fixture for testing a plurality of longitudinal battery cells is provided. The test fixture includes a base plate, a plurality of holding structures for holding the battery cells, and a plurality of contacts arranged on the base plate. The holding structures are mounted on the base plate and configured to hold the battery cells in an orientation in which their longitudinal axes are perpendicular with respect to the base plate. The plurality of contacts are arranged on the base plate such that they are adapted to electrically contact positive and negative terminals of each of the battery cells.

According to example embodiments, an effector for engaging and disengaging a plurality of longitudinal battery cells is provided. The effector includes a holder device and a plurality of effector units. The effector units are arranged at the holder device and each effector unit is configured to selectively engage and disengage one of the plurality of battery cells. Furthermore, the effector includes a distance control unit coupled to the plurality of effector units. The distance control unit is configured to selectively control a distance between the effector units.

According to example embodiments, a system for assembling a battery module is provided. The battery module includes a plurality of longitudinal battery cells. The system includes a test fixture for testing at least a part of the plurality of battery cells, and an effector for transferring at least a part of the plurality of battery cells from the text fixture into the battery module. The text fixture includes a base plate, a plurality of holding structures for holding the battery cells, and a plurality of contacts arranged on the base plate to electrically contact positive and negative terminals of each of the battery cells. The holding structures are mounted on the base plate and configured to hold the battery cells with their longitudinal axes being perpendicular with respect to the base plate. The effector includes a holder device, a plurality of effector units arranged on the holder device, and a distance control unit. Each of the effector units is configured to selectively engage and disengage one of the plurality of battery cells. A distance control unit is configured to selectively control a distance between the effector units.

According to example embodiments, a method for manufacturing a battery module is provided. The battery module includes a battery module frame for receiving a plurality of longitudinal battery cells. According to the method, a plurality of battery cells is automatically picked up by a test fixture from a delivery packaging of the battery cells. Furthermore, a voltage of each of the plurality of picked up battery cells is automatically tested in the test fixture, and based on a result of the testing, the battery cells are automatically transferred from the test fixture to the battery module frame by an effector.

Although specific features described in the above summary and the following detailed description are described in connection with particular embodiments, it is to be understood that the features may be combined with each other unless it is noted otherwise.

Hereinafter, exemplary embodiments of the present invention are described in more detail with reference to the drawings.

DETAILED DESCRIPTION

In the following, exemplary embodiments of the present invention are described in further detail. It is to be understood that the following description is given only for the purpose of illustrating the principles hereof and is not to be taken in a limiting sense.

It is to be understood that the features of the various exemplary embodiments described herein may be combined with each other unless specifically noted otherwise.

Figure 1:
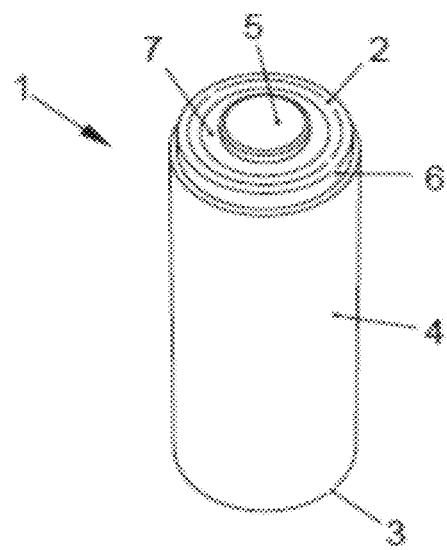
FIG. 1 schematically illustrates a perspective view of a longitudinal battery cell.

According to example embodiments, a test fixture for testing a plurality of longitudinal battery cells is provided. The battery cells may be cylindrical battery cells or prismatic battery cells. Preferably, the battery cells may be rechargeable battery cells, for example battery cells of a so-called 18650 cell type as shown in FIG. 1 having a diameter of 18 mm and a length of 65 mm. The battery cells may have a positive electrical contact or terminal at a center of a first end of the battery cell, and may have a negative electrical contact or terminal at an opposite second end of the battery cell. However, the negative electrical contact at the second end may be electrically connected to a circumferential surface of the battery cell and an annular rim at the first end surrounding the positive electrical contact. The test fixture includes a base plate, a plurality of holding structures for holding the battery cells in an upright position, and a plurality of contacts arranged on the base plate to electrically contact the positive and negative terminals of each of the battery cells. The holding structures are mounted on the base plate and are configured to hold the battery cells with their longitudinal axis being perpendicular with respect to the base plate.

When the battery cell is arranged with its longitudinal axis perpendicular with respect to the base plate with the first end of the battery cell facing the base plate, the contacts arranged on the base plate can easily and reliably contact the positive and negative terminals of the battery cell by contacting a center of the first end and a rim of the first end. The plurality of holding structures may include a plurality of pins arranged perpendicular with respect to the base plate. The pins may be inserted in corresponding holes in the base plate or may be mounted in any appropriate manner at the base plate. For example, each battery cell may be held by four pins arranged in a rectangular pattern. This ensures a reliable holding of each battery cell separated from neighboring battery cells. Furthermore, the test fixture using pins as holding structures for holding the battery cells can be provided cost effectively.

The plurality of contacts may include for each battery cell a first electrical pin configured to contact the electrical terminal of the battery cell protruding from the center of the first end face of the battery cell, and a second pin configured to contact a contact lip or the contact rim of the battery cell extending from the cylindrical lateral surface of the battery cell on the side of the first end face.

The test fixture may include a connector to electrically couple the plurality of contacts of the test fixture to a test circuit for testing the voltage of the battery cells. By coupling the test fixture via a connector to the test circuit, the test fixture can be easily exchanged by another test fixture having for example a different number of holding structures for holding a different number of battery cells or having a different arrangement of the holding structures for holding the battery cells in a different arrangement.

Battery cells are usually delivered in delivery packagings wherein the battery cells are arranged standing upright with their longitudinal axis being arranged in parallel. The holding structures of the test fixture may be configured such that the holding structures can be inserted into gaps between the battery cells, when the battery cells are arranged in the delivery packaging. This allows a plurality of battery cells to be picked up by the test fixture within one step from the delivery packaging by arranging the test fixture with respect to the delivery packaging such that the holding structures are inserted into the gaps between the battery cells, turning the test fixture together with the battery cells and the packaging such that the battery cells are held against the base plate by virtue of gravity, and removing the delivery packaging and leaving the battery cells within the holding structures of the test fixture. Thus, an easy unpacking and moving of the battery cells is accomplished.

As each battery cell is individually contacted via the plurality of contacts of the base plate to the test circuit, the voltage of each battery cell can be tested individually, and thus each battery cell can be tested before it is further processed, for example before the battery cell is built into a battery module.

According to example embodiments, an effector for engaging and disengaging a plurality of longitudinal battery cells is provided. The effector includes a holder device, a plurality of effector units arranged at the holder device, and a distance control unit. Each effector unit is configured to selectively engage and disengage one of the plurality of battery cells. The distance control unit is configured to selectively control and adjust a distance between the effector units. The effector units may be linearly arranged at the holder device, and the distance control unit may be configured to selectively linearly displace the effector units in order to selectively control the distance between neighboring effector units.

The effector may be a so-called end effector at a robot arm for transferring a plurality of battery cells from one location, for example, from the above-described test fixture, to another location, for example, a battery module in which the battery cells are to be built in. As the effector includes a plurality of effector units, for example, three to ten effector units, especially, for example, six effector units, a plurality of battery cells can be moved from one location to another location with one movement of the robot arm. This increases a throughput when a lot of battery cells have to be processed, for example, when several hundreds or thousands of battery cells have to be processed to build up a battery module for a vehicle. As the distance between the battery cells at the first location, for example, at the test fixture, may be different than the distance between the battery cells at the second location, for example, at the battery module, the distance control unit controls and adjusts the distance between the effector units, for example, during a movement of the robot arm between the two locations.

The effector may include a rotary unit coupled to the holder device. The rotary unit may be adapted to rotate the holder device together with the plurality of effector units. Thus, the effector can be appropriately adjusted to pick up the battery cells from the first location and to transfer the battery cells to the second location no matter how a line of battery cells is arranged in the first and the second location.

Each effector unit may be provided with an electromagnet configured to selectively engage and disengage a physical contact area of the electromagnet with a magnetic end face of one of the battery cells by selectively actuating the electromagnet. As many battery cells, especially, for example, 18650 battery cells, provide at least at one end of the battery cell a magnetic material, by use of magnetic force the battery cell can be easily picked up and released. Alternatively, instead of an electromagnet also a permanent magnet may be used in the contact area of the effector unit to engage with the end face of the battery cell, and an ejector device, for example, an ejector pin or an air pressure outlet in the contact area of the effector unit may be used to disengage the battery cell from the effector unit. Furthermore, beside a magnetic force, a vacuum may be used to engage the end face of the battery cell with the effector unit. For example, the effector unit may be provided with a suction area configured to selectively engage and disengage the suction area with the end face of the battery cell by activating and deactivating suction, for example, by activating and deactivating a vacuum pump. As an alternative, for example, a passive suction cup can be pushed by the effector unit onto the end face of the battery cell to engage the battery cell and a mechanical pin ejection or an air pressure outlet may be used for disengaging the battery cell from the effector unit.

According to example embodiments, the contact area of the effector unit where the effector unit contacts the end face of the battery cell is smaller than a corresponding contact area of the battery cell. When the contact area of the effector unit is smaller than the contact area of the battery cell, a contact, especially an electrical contact, between the contact area of the effector unit and a neighboring battery cell held by a neighboring effector unit of the effector can be avoided.

According to example embodiments, a system for assembling a battery module is provided. The assembled battery module includes a plurality of longitudinal battery cells. The system includes a test fixture for testing and holding at least a part of the plurality of battery cells, and an effector, for example, an end effector of a robot arm, for transferring at least a part of the plurality of battery cells from the test fixture to the battery module. The test fixture includes a base plate, a plurality of holding structures for holding the battery cells, and a plurality of contacts arranged on the base plate. The holding structures are arranged on the base plate and are configured to hold the battery cells with their longitudinal axes being perpendicular with respect to the base plate. The contacts are arranged such on the base plate that they are adapted to electrically contact positive and negative terminals of each of the battery cells. The effector includes a holder device, a plurality of effector units, and a distance control unit. The effector units are arranged on the holder device. Each effector unit is configured to selectively engage and disengage one of the plurality of battery cells. The distance control unit is configured to selectively control a distance between the effector units.

According to example embodiments, the system includes a monitoring device for monitoring receiving locations in the battery module. The battery module includes a plurality of receiving locations for receiving the plurality of battery cells. By monitoring the receiving locations the monitoring device is adapted to determine if a receiving location is empty or if a battery cell is correctly inserted in the receiving location. The monitoring device may include, for example, a camera, a laser sensor, an ultrasonic sensor, a weight sensor or a combination thereof. Thus, the system is adapted to verify that all the locations intended to be loaded with battery cells are in fact empty and ready to receive the battery cells. Furthermore, the monitoring device allows to verify after disengaging the battery cells from the effector that the battery cells have been correctly placed in the corresponding receiving locations.

According to example embodiments, a method for manufacturing a battery module including a battery module frame for receiving a plurality of longitudinal battery cells is provided. According to the method, a plurality of battery cells is automatically picked up by a test fixture from a delivering packaging of the battery cells. Furthermore, a voltage of each of the plurality of picked up battery cells is automatically tested in the test fixture. Based on a result of the testing the battery cells are automatically transferred from the test fixture to the battery module frame by using an effector.

According to example embodiments, the plurality of battery cells are arranged in the delivery packaging such that the battery cells are arranged in parallel with respect to their longitudinal axis. The plurality of battery cells may be picked up from the delivery packaging by inserting holding structures arranged on a base plate of the test fixture into gaps between the battery cells in the delivery packaging from the top, and turning the test fixture together with the battery cells and the delivery packaging such that the battery cells are held by the holding structures and the base plate.

For example, first the battery cells may be held by virtue of gravity in an opened delivery packaging. Then, the test fixture is lowered from above the delivery packaging with the holding structures pointing downwards to the delivery packaging on the delivery packaging such that the holding structures are inserted into the gaps between the battery cells. Then, the test fixture is rotated together with the battery cells and the delivery packaging by 180° such that the test fixture is below the battery cells and the delivery packaging. By virtue of gravity, the battery cells abut against the base plate of the test fixture and the delivery packaging can be removed leaving the battery cells on the base plate of the test fixture and being held by the holding structures. Thus, an easy and reliable unpackaging of the battery cells can be accomplished. Furthermore, the unpackaged battery cells can be voltage-tested simultaneously in the test fixture.

According to example embodiments, when transferring the battery cells from the test fixture to the battery module, additionally those battery cells which fulfill a pass criterion in the testing are automatically identified, and the battery cells are engaged or picked up with the effector. For this, the effector includes a holder device and a plurality of effector units arranged at the holder device, wherein each of the effector units selectively engages one of the plurality of battery cells. The engaged or picked up battery cells are removed from the test fixture by lifting the effector. A distance between the effector units is adjusted according to a distance between receiving openings for the battery cells in the battery module frame. The battery cells are then transferred and inserted in the battery module frame, and the battery cells are disengaged or released from the effector units. Battery cells which did not pass the voltage test may be automatically transferred from the test fixture to a quality control disposition area. Furthermore, according to the method, an automatic monitoring may be performed to determine before the battery cells are inserted in the receiving openings if the receiving openings are empty or if the battery cells are inserted correctly in the receiving openings after inserting the battery cells.

The above-described example embodiments will now be described in more detail with reference to the accompanying drawings.

Electric drive vehicles or hybrid vehicles may include an electrical engine for providing a driving force for driving the vehicle. Such vehicles include a battery module providing electrical energy for the electrical engine. The battery module may include rechargeable battery cells which may be charged with electrical energy of an electrical power system or with electrical energy generated by a combustion engine of the vehicle. Typically, the battery module includes a large number of battery cells. The battery module of an electric vehicle may include several hundreds up to several thousands of battery cells. In the present context, the terms battery module and battery pack will be used synonymously. In the following description, the automation of a number of manufacturing process steps when making a battery module for an electric drive vehicle will be described. The battery modules include cylindrical cells, such as cylindrical cells of the type 18650 as shown in FIG. 1. However, the devices, systems and methods described below are equally applicable for a number of other form factors, for example cubic or prismatic battery cells.

The battery cell 1 shown in FIG. 1 has a longitudinal cylindrical form with a first end 2 shown in FIG. 1 at an upper side and a second end 3 shown in FIG. 1 at a lower side. The lower second end 3 is a substantially flat and has a circular face. The second end 3 is made of a conducting material which provides the negative terminal of the battery cell 1. Typically, the second end 3 is electrically connected to a material which composes the circumferential surface 4 of the battery cell 1. The upper first end 2 of the battery cell 1 includes a positive electrical contact or terminal 5 in a center at the first end 2. A rim 6 of the first end 2 is electrically connected to the circumferential surface 4 and provides therefore a negative electrical contact of the battery cell 1 at the first side 2. Between the negative rim 6 and the positive electrical contact 5 an insulating material 7 is provided. The above described battery cell 1 is an exemplary embodiment of a battery cell to be used in connection with methods and devices described herein. However, other example embodiments of battery cells may be used in connection with the methods and devices described herein, e.g., a battery cell having the positive electrical terminal and the negative electrical terminal exchanged, i.e., providing the positive electrical terminal at the second end 3, the circumferential surface 4, and the rim 6, and providing the negative electrical terminal at the terminal 5 of the first end 2.

Figure 2:
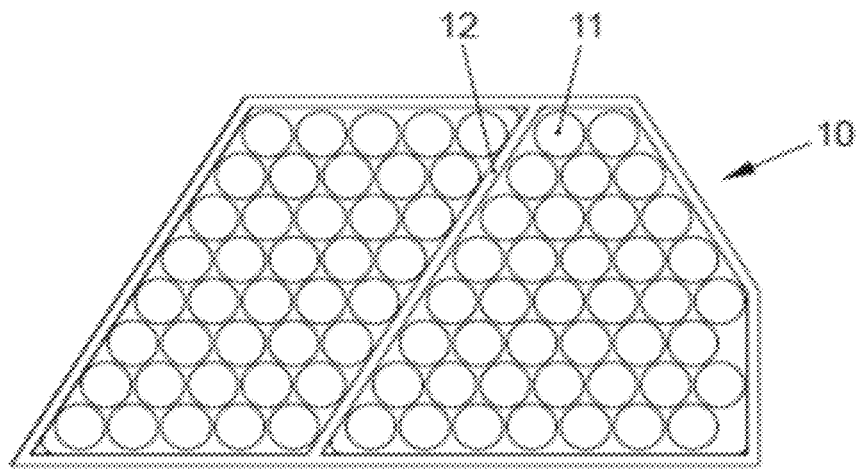
FIG. 2 schematically illustrates a top view of a battery module for accommodating a plurality of battery cells.
Figure 3:
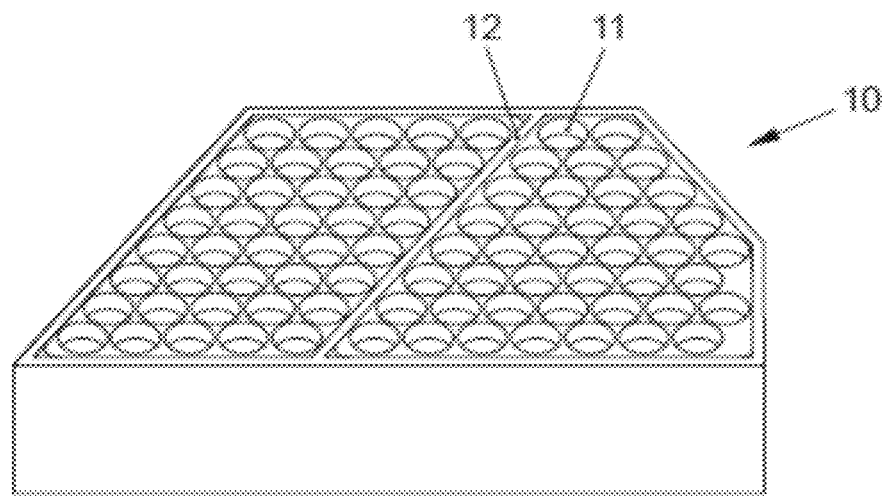
FIG. 3 is a perspective view of the battery module of FIG. 2.

Battery modules using the above-described battery cell type 18650 typically will be made with 200 to 1200 cells each, but could be larger. As shown for example in FIGS. 2 and 3, the cells may be arranged in holes 11 of a frame 10, typically made of plastic, in a dense geometric pattern. A diameter of each hole 11 in the frame 10 is approximately 18 mm which matches the diameter of the 18650 battery cells 1 and there is typically a standard minimum separation between the battery cells, for example 1 to 5 mm. However, the battery cell diameter and the separation size can be varied for a particular configuration. There are major walls 12 shown in FIGS. 2 and 3 separating battery cell groups with an equal number of battery cell locations per battery cell group. The location of these major walls 12 can be highly varied due to their infinite range of possible geometries. The number of battery cell groups within one battery module may be larger than two and may be varied for a particular configuration, for example, one battery module may include eleven or sixteen battery cell groups. When battery cells 1 are inserted automatically into the holes 11 of the frame 10 this automation should therefore be able to address the complexity and should be quickly reconfigurable for battery module frames with different cell packaging arrangements and geometries.

Figure 4:
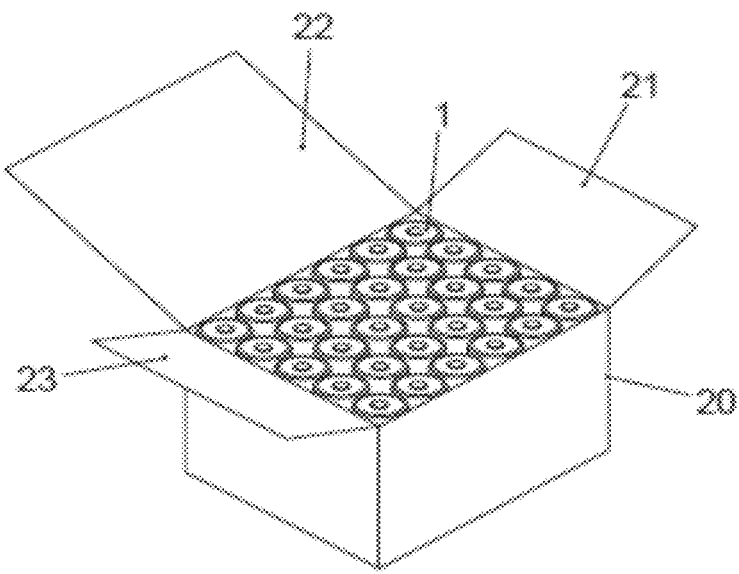
FIG. 4 illustrates a delivery packaging for battery cells containing thirty battery cells.

The battery cells 1 may be delivered from a supplier on a pallet including a number of outer boxes. Each outer box includes a plurality of inner boxes, and each inner box includes a plurality of battery cells. Typically, the inner boxes are identical in size within the outer box, but may also be varied in size if appropriate. In the present context, the outer boxes will also be called transport boxes, and the inner boxes will also be called delivery packaging. FIG. 4 shows an exemplary delivery packaging 20. The exemplary delivery packaging 20 provides thirty battery cells 1 arranged in a six by five grid pattern. The number of battery cells 1 per delivery packaging 20 may vary widely among different suppliers. In this description the example of six by five battery cells 1 per delivery packaging 20 is used as primary example, but the methods and systems and devices are completely adaptable to other battery cell packagings and shipping arrangements.

The use of the battery cells 1 in the battery modules 10 requires the battery cells 1 to be unloaded from the delivery packaging 20, tested, and inserted into the holes 11 of the plastic frames of the battery modules 10. The processing includes for example the following processing steps:

1. Unload larger transport boxes including the delivery packagings from a pallet onto a conveyor.
2. Open each transport box.
3. Unload delivery packagings onto a conveyor and discard transport boxes.
4. Open each delivery packaging.
5. Transfer battery cells onto a battery cell voltage test fixture.
6. Discard delivery packaging.
7. Test battery cell voltages.
8. Transfer battery cells which fulfill test criteria into plastic frame of a battery module and move the battery cells which do not fulfill the test criteria to a quality control disposition area.

The above steps will now be described in more detail.

Step 1: Unload Larger Transport Boxes from Pallet onto a Conveyor

There are numerous manners of moving boxes from a pallet to a conveyor. This could be a robot, or if not automated, one or more people manually moving the boxes.

Step 2: Open each Transport Box

There are numerous manners of opening the transport boxes including with a box cutter.

Step 3: Unload Delivery Packagings onto a Conveyor and Discard Transport Boxes

There are numerous manners of selecting and sequencing individual delivery packagings from a transport box that is sliced open. A robot could be able to perform this task with relative ease.

Step 4: Open each Delivery Packaging to Reveal Battery Cells

The end result of this step is as shown previously in connection with FIG. 4. A key feature of this step is that the positive side of each battery cell 1 is facing up when the delivery packagings 20 are opened. The positive side of each battery cell has a vent that sticks out above the rest of the battery cell 1. In contrast, the negative side 3 of the battery cell is generally flat and is magnetic. However, there are numerous manners of opening flaps 21 to 23 of the delivery packaging 20 that are common in industry. One common method is a series of mechanical arms with suction cups to be used for each flap 21 to 23.

Step 5: Transfer Battery Cells onto a Cell Voltage Test Fixture

Figure 5:
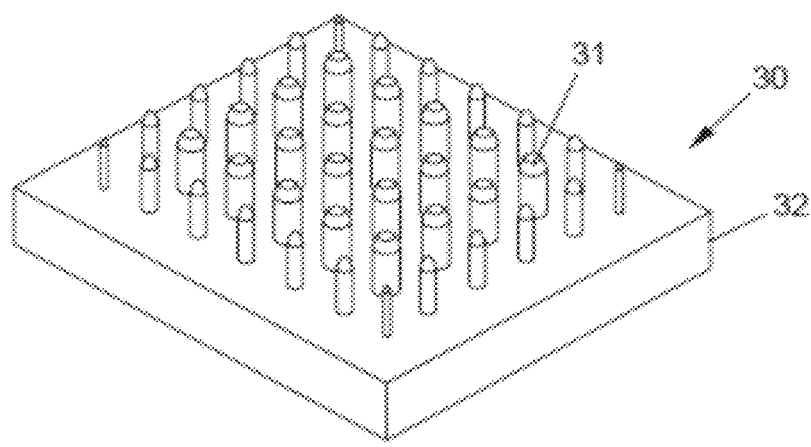
FIG. 5 schematically illustrates a perspective view of a test fixture according to an example embodiment of the present invention.
Figure 6:
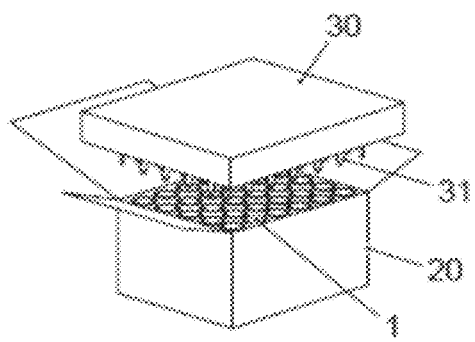
FIGS. 6 to 11 schematically illustrate a transfer of a plurality of battery cells from the delivery packaging of FIG. 4 to the test fixture of FIG. 5 according to an example embodiment of the present invention.

FIG. 5 shows a cell voltage test fixture (CVTF) 30 that includes a base plate 32 and a series of pins 31 that are configured to hold battery cells 1 upright when placed in it. Other features (not shown) of the test fixture 30 allow the test fixture 30 to be handled by a robot or mechanical arm for movement in and out of a voltage tester, or to interface with a delivery packaging 20 including battery cells 1, or to be placed on a conveyor after it has been loaded with battery cells 1 from the delivery packaging 20. Furthermore, the test fixture 30 includes electrical pins or contacts for each position for each battery cell that are used to measure cell voltages.

Figure 7:
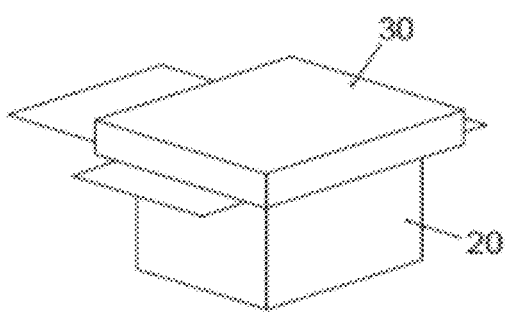
Figure 8:
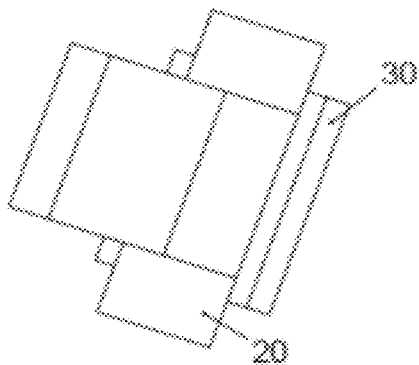
Figure 9:
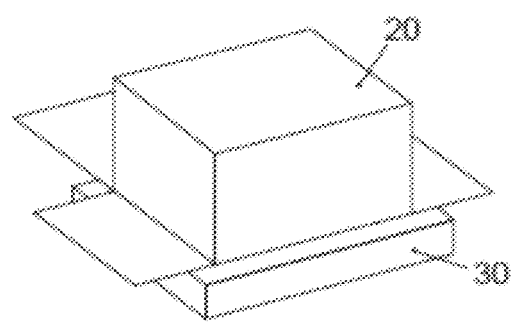

The test fixture 30 may be moved by any of a variety of mechanical, robotic, etc., systems to accomplish the steps shown in FIGS. 5 to 9. In FIG. 5 the test fixture 30 is inserted with the pins 31 pointing downwards and aligned such that the pins 31 are adapted to be moved in spaces between the battery cells 1 of the delivery packaging 20. The pins 31 may include tips to ease inserting between the battery cells 1. Then the test fixture 30 is lowered down and approaches the battery cells 1. In FIG. 7 the test fixture 30 is lowered to rest on the opened delivery packaging 20 with the pins 31 of the test fixture 30 being in gaps between the battery cells 1. In FIG. 8 the test fixture 30 and the delivery packaging 20 with the battery cells 1 are rotated together such that the battery cells 1 do not fall out of the delivery packaging 20. After rotation the test fixture 30 is arranged such that the pins are standing upright as shown in FIG. 5 with the battery cells and the delivery packaging 20 arranged on the test fixture 30 as shown in FIG. 9. The battery cells 1 are arranged such that the positive ends are pointing downwards in a direction of the base plate 32 of the test fixture 30.

Step 6: Discard Delivery Packaging

Figure 10:
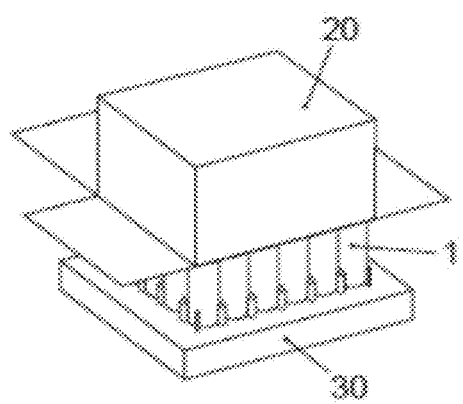
Figure 11:
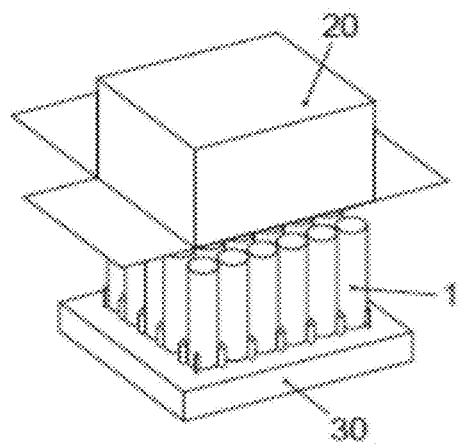
Figure 12:
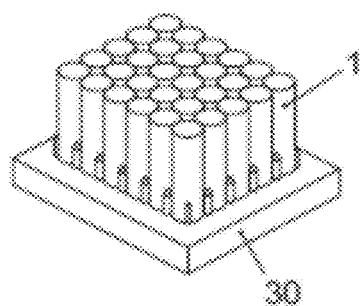
FIG. 12 illustrates an arrangement of battery cells on the test fixture of FIG. 5 in a perspective view.
Figure 13:
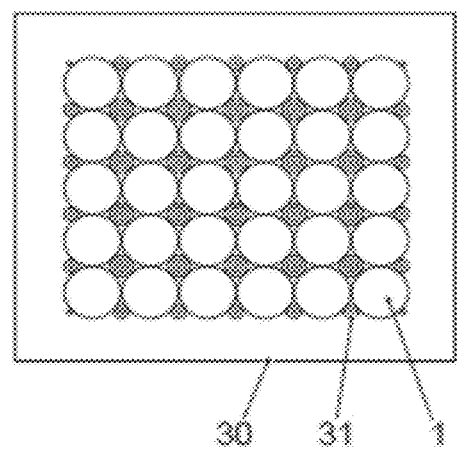
FIG. 13 shows the arrangement of FIG. 12 in a top view.

The removal and discarding of the delivery packaging 20 from the battery cells 1 is a relatively easy automation task and can be performed by a mechanical arm or robot as shown in FIGS. 10 and 11. Once the delivery packaging 20 is removed from the battery cells 1 as shown in FIG. 11, the delivery packaging 20 can be discarded. The result of this step is shown in FIGS. 12 and 13 with the negative ends 3 of the battery cells 1 at the upper side.

Step 7: Test Battery Cell Voltages

As noted previously, a feature of this arrangement is the presentation of the negative side of the battery cells 1 at the upper side. This orientation allows the battery cells 1 to be picked up from its negative end 3 with for example a magnet or a suction device without any danger of shorting the positive terminal 5 having the positive voltage and the rim 6 having the negative voltage. This orientation (with the negative side of the battery cells 1 up) also allows the voltage of each battery cell 1 to be measured while the battery cells 1 are arranged in the test fixture 30 without further handling the battery cells 1. This voltage testing immediately before loading the battery cells 1 into the battery module 10 is a critical quality control step since it helps to find cells with so-called weak shorts or other defects. The weak short defect is difficult to fully detect at the suppliers factory and may lead to suboptimal battery modules if these weak short cells are used. This defect is found by measuring and comparing the voltage of each battery cell to other battery cells in its package that were made at the same time and left the factory at nearly the same identical voltage. While this testing can be done manually, it is laborious, slower and subject to error if not automated. Therefore, the battery cells 1 are tested automatically in the cell voltage test fixture 30. As shown in FIGS. 12 and 13, the battery cells 1 are loaded onto the test fixture 30 with the negative side of the cells up. There are two pins or electrical contacts that pass through the test fixture 30 at each cell location, one pin for the positive terminal 5 and another pin in contact with the battery cells outer lip or rim 6 at the end 2 of the battery cell 1 that is at the negative voltage of the cell. Each of the pins for electrically contacting the battery cells are connected via for example a ribbon cable connected to the test fixture 30 to an electrical test circuit. The electrical test circuit is adapted, for example, via relays, to connect the two pins in electrical contact with each battery cell in the test fixture 30 so that the voltage of each battery cell can be measured in sequence under, for example, a computer control. A representative set of results (battery cell voltages in mV) is exemplarily listed in the following table:

|     | Col     |         |         |         |         |         |
| --- | ------- | ------- | ------- | ------- | ------- | ------- |
| Row | A       | B       | C       | D       | E       | F       |
| 1   | 3640.37 | 3640.59 | 3641.13 | 3624.27 | 3640.29 | 3638.92 |
| 2   | 3640.75 | 3640.06 | 3639.68 | 3640.14 | 3641.43 | 3641.43 |
| 3   | 3641.59 | 3642.20 | 3642.12 | 3630.45 | 3640.90 | 3640.29 |
| 4   | 3642.04 | 3638.46 | 3641.59 | 3630.52 | 3640.90 | 3641.13 |
| 5   | 3640.90 | 3640.21 | 3641.20 | 3640.82 | 3638.61 | 3640.59 |

Based on these measurements for each battery cell 1 it will be determined if the battery cell voltage is within a designated permissible range and thus the battery cell will be deemed acceptable for loading into the battery module 10, or if the battery cell voltage lies outside the permissible range and thus the battery cell will be deemed unacceptable and designated for discard or other quality control disposition. These latter battery cells will not be loaded into the battery module 10. For example, battery cells within a range of 3.635 V to 3.645 V are determined to be adapted for loading into the battery module 10 and all others are not. In the example of the table above, battery cell in location D1 would be deemed bad since it its voltage is below the minimal allowed voltage. After the voltages have been measured, the cells in the test fixture 30 will be moved together with the test fixture 30 on, for example, a conveyor to a location where a robot loads the battery cells which have passed the voltage test, the so-called good battery cells, from the test fixture 30 into the battery module 10, as will be described in the following step.

Figure 14:
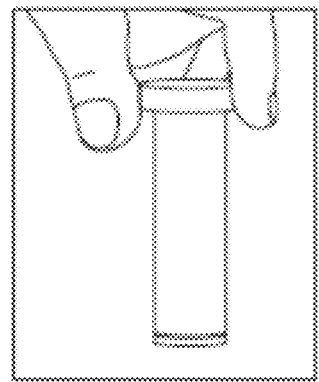
FIG. 14 shows a battery cell being held by a magnet.

Step 8: Transfer Good Battery Cells into the Battery Module and Move Bad Battery Cells to the Quality Control Disposition Area Battery cells of the type 18650 can be handled and manipulated with magnets. FIG. 14 shows a single 18650 battery cell being held by a magnet. The magnet can be either a permanent or an electromagnet.

As shown in FIG. 12, the battery cells 1 in the test fixture 30 are ready for loading, or as noted, some battery cells may be bad and not suitable for loading in the battery module 10. These bad cells can be separately moved with a robotic end effector to a discard box or other quality control disposition control location, or the bad cells could be dumped in such a location as the test fixture 30 is moved for reloading with new cells.

Figure 15:
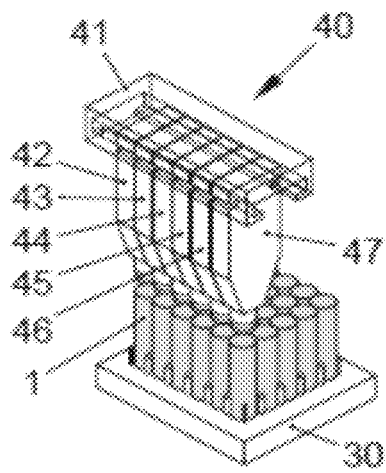
FIGS. 15 to 18 schematically illustrate in a perspective view a picking up of a plurality of battery cells from the test fixture of FIG. 5 with an effector according to an example embodiment of the present invention.
Figure 16:
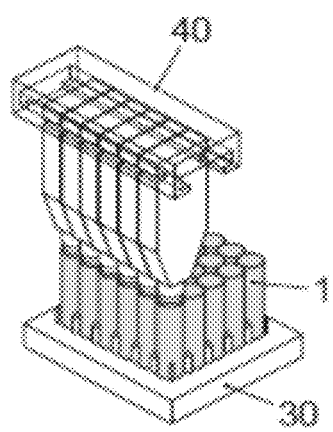
Figure 17:
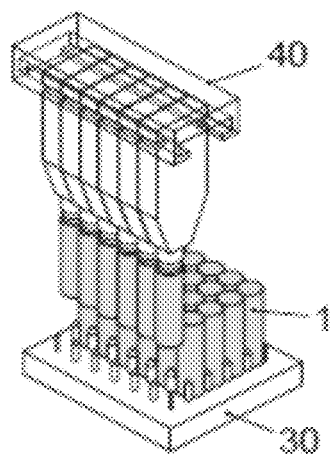

An example embodiment of a robotic end effector 40 is shown in FIG. 15. The end effector 40 includes a holder device 41 and for example six effector units 42 to 47. The effector units 42 to 47 are each adapted to pick up one battery cell at the lower end 3 of the battery cell 1. For picking up the battery cells, each effector unit 42 to 47 includes at its lower end a magnet or a suction device as will be described below. Each effector unit 42 to 47 will be called in the following also finger. The end effector 40 can be made with any number of fingers, but likely will be arranged for picking up all the battery cells in one row or one column of one or more test fixtures in close proximity. FIGS. 15 to 17 illustrate an end effector 40 with six fingers 42 to 47 descending to the top of a row of battery cells 1 in the test fixture 30 and picking them up. For example, a permanent magnet may be used in each finger. The magnet will pick up the battery cells 1 when it gets in close proximity to the negative flat end 3 of the battery cell 1. If an electromagnet is used in each finger, the magnetic force will not be present until the electromagnet is energized which will be done under for example computer control. As shown in FIGS. 15 to 17, the robot end effector 40 with six fingers 42 to 47 approaches (FIG. 15), engages (FIG. 16) and picks up (FIG. 17) six battery cells 1 from one row of battery cells in the test fixture 30.

Figure 18:
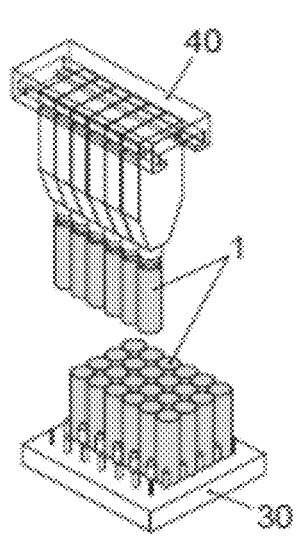
Figure 19:
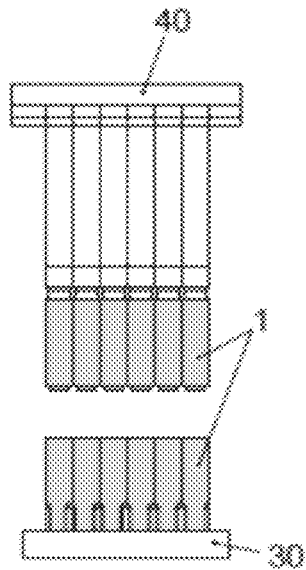
FIGS. 19 and 20 illustrate the arrangement of FIG. 18 in which the battery cells are picked up by the effector in two different side views.
Figure 20:
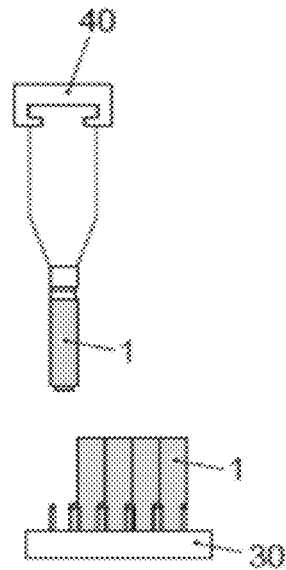

FIGS. 18 to 20 show a perspective view, a front view and a side view of the end effector 40 with six fingers 42 to 47 lifting six battery cells 1 from a single row of battery cells 1 in the test fixture 30.

The magnet in contact with the negative side 3 of the battery cell 1 is smaller in area than the bottom area 3 of the battery cell 1 and therefore does not grip or hold the battery cell 1 from its side. This is an important aspect since it allows battery cells to be placed with minimal interference or contact risk with other battery cells. Due to type tolerances or other mechanical aspects of the battery module 10 with or without battery cell spacers, an end effector 40 whose fingers grip from the side might not be able to place battery cells in all circumstances without collisions.

Figure 21:
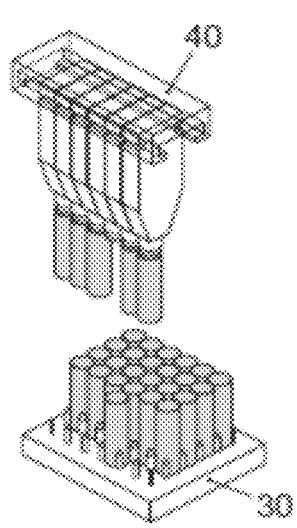
FIG. 21 is a perspective view of an effector with picked up battery cells.
Figure 22:
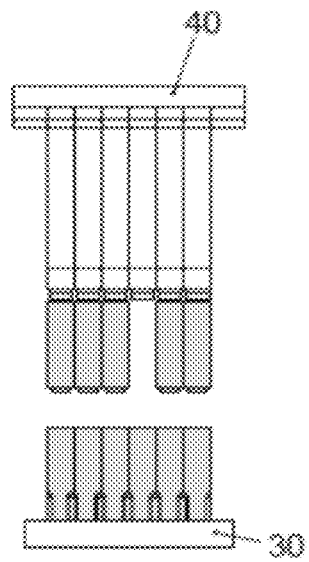
FIG. 22 illustrates the effector of FIG. 21 in a side view.

FIGS. 21 and 22 show an arrangement in which the effector 40 leaves a bad battery cell in the test fixture 30. As shown in FIGS. 21 and 22, the bad battery cell is left in the test fixture 30 while the other battery cells in the same row are picked up. However, also good battery cells can be left in the test fixture 30 for later use, if the algorithm controlling the sequence of the battery cell pickup makes that determination.

Figure 23:
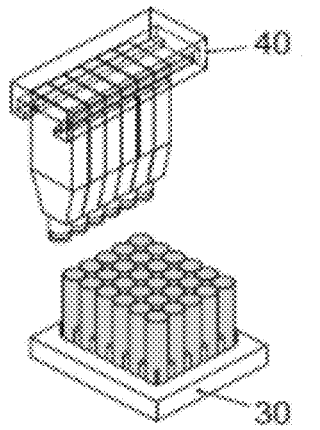
FIGS. 23 to 25 show steps of picking up a plurality of battery cells from a test fixture with an effector.
Figure 24:
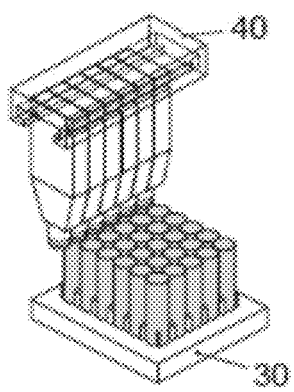
Figure 25:
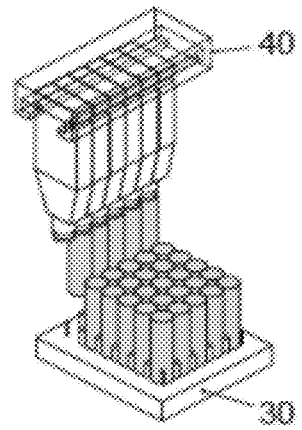

The end effector 40 and the fingers 42 to 47 can pick up battery cells 1 from the test fixture 30 in any of a number of manners or orientations. As shown in FIGS. 23 to 25, the end effector 40 can be arranged 90° from the orientation shown in FIGS. 15 to 22 to pick up a column of battery cells instead of a row of battery cells. In this orientation the test fixture 30 has five battery cells to be picked up from the column shown. Only five of the six fingers 42 to 47 lift battery cells while the sixth finger is not utilized for this lift.

The step of placement of the battery cells 1 in the battery module 10 will now be described in more detail. The sequence of operations in this process step includes picking up battery cells, placing them in the battery module 10, and then returning to the test fixture 30 to get more battery cells for placement. With a suitable fast robot a cycle time for pick up, move, place and return for more cells for a sixth-finger end effector will average approximately 6 seconds or less. This operation is expected to have a process yield of nearly 100% so the expected time per battery cell placement is expected to average approximately 1 second or less. Furthermore, multiple robots may work over a long or large battery module 10 simultaneously so that battery cells may be loaded from multiple positions and multiple test fixtures 30 at the same time. The sequence of placement of battery cells in the battery module 10 may be managed by a computer program in communication with a robot, the end effector 40, the battery cell voltage tester and a machine vision system that provides a status about whether a given battery cell location in the battery module 10 is empty, full, or if a battery cell was not successfully loaded, for example if the battery cell is lying atop the battery module 10.

The end effector 40 with the fingers 42 to 47 can be positioned above the battery module 10 in a number of orientations prior to a successful placement of the battery cells 1 in the battery module 10. The gap or distance between each finger 42 to 47 at the end effector 40 may also be under computer control so that the gap can be one value for battery cell pickup from the test fixture 30 and another value for placement of the battery cell in the battery module 10.

Figure 26:
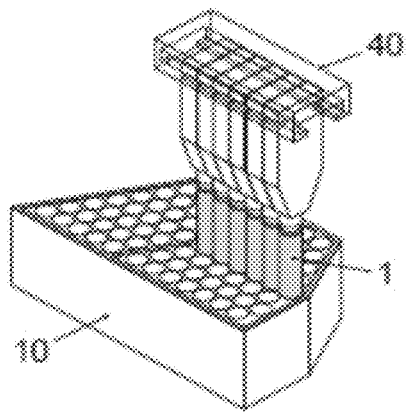
FIG. 26 schematically illustrates an inserting of a plurality of battery cells into a battery module by use of an effector in a perspective view.
Figure 27:
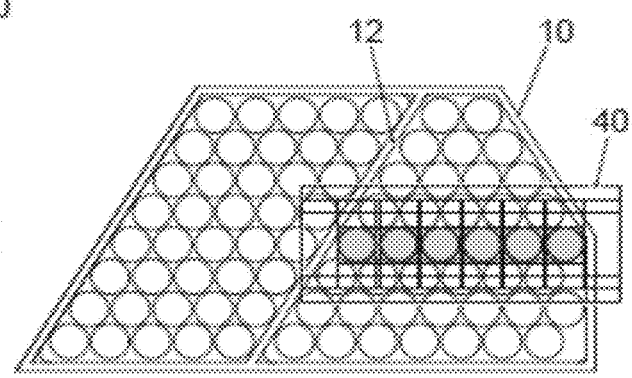
FIG. 27 illustrates the inserting of FIG. 26 in a top view.

FIGS. 26 and 27 show the positioning of the end effector 40 with six fingers 42 to 47 each holding a battery cell 1 above the battery module 10 for battery cell placement. In these figures, the gap between successive fingers is identical, however, this is not always the case as will be shown below.

The depth to which the robot and the end effector 40 move down prior to release of the battery cells 1 depends on the details of the battery module 10 and the battery cells 1 to be loaded. For example, a release from above the top surface of the battery module 10 may be possible. In other arrangements, it may be necessary to lower the battery cells a part or all the way into the battery module 10 before release.

Figure 28:
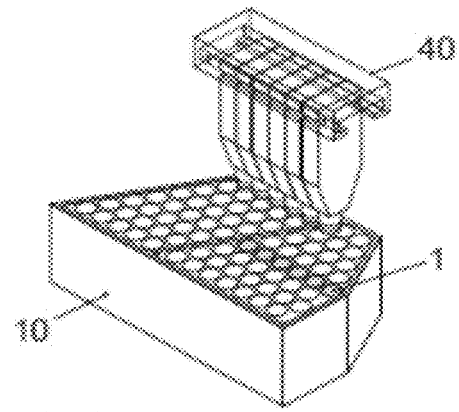
FIG. 28 illustrates a situation after the battery cells of FIG. 26 have been inserted into the battery module and are released from the effector.

The release of battery cells from each finger depends on the form of magnet used. If the fingers 42 to 47 use permanent magnets, for example, a pin or solenoid would be fired or puff of air to physically push the battery cell from the permanent magnet and then allowing it to fall by the force of gravity into a corresponding hole in the battery module 10. If the fingers 42 to 47 use electromagnets, the cell drop may be accomplished simply by turning off the electromagnet and allowing the battery cell to fall by the force of gravity into the hole 11 of the battery module 10. FIG. 28 shows the battery cells 1 in the battery module 10 following their release after positioning as shown in FIGS. 26 and 27.

Figure 29:
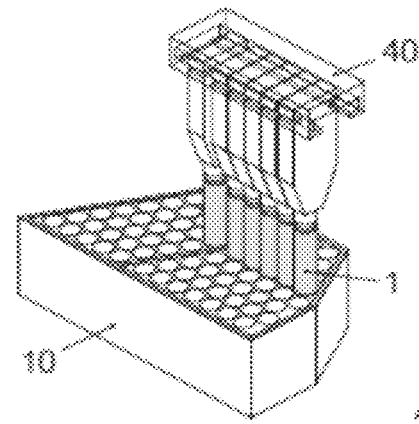
FIGS. 29 to 33 illustrate an inserting of a plurality of battery cells into a battery module.
Figure 30:
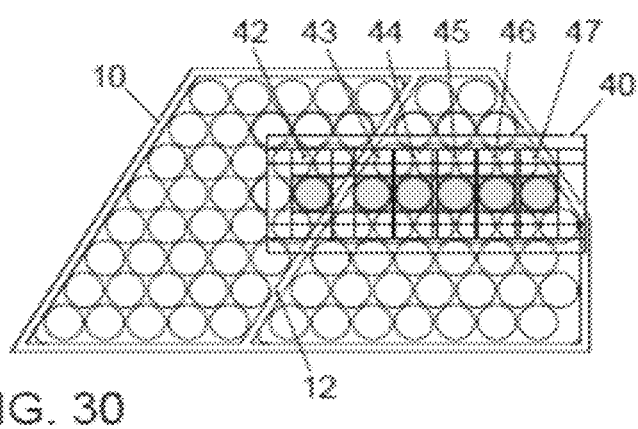

According to example embodiments, the fingers 42 to 47 are individually controllable and moveable so that different spacing gaps are achievable between successive fingers. This functionality provides great flexibility due to a position of the wall 12 of the battery module 10. FIGS. 29 and 30 show the positioning of the end effector 40 with six fingers, each holding a battery cell 1 above the battery module 10 ready for cell placement. In FIGS. 29 and 30, the gap between successive fingers is not identical. In the illustrated arrangement, the gap or distance between fingers 42 and 43 is larger than the gaps between the fingers 43 to 47. The larger gap between fingers 42 and 43 is adapted to corresponding holes 11 of the battery module 10 lying on different sides of the wall 12. In this case, the wall 12 between two zones of battery cells would interfere with the placement of the six battery cells unless the finger 42 is moved to a different gap distance. However, with the spacing of the fingers shown in these figures, there is much greater flexibility in the algorithmic programming for the sequence of cell loading as well as offering far higher productivity since the number of load, move and place cycles with less than a full finger load can be minimized.

Figure 31:
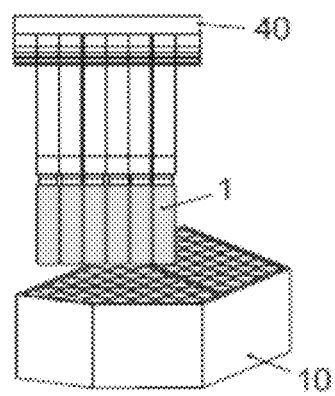
Figure 32:
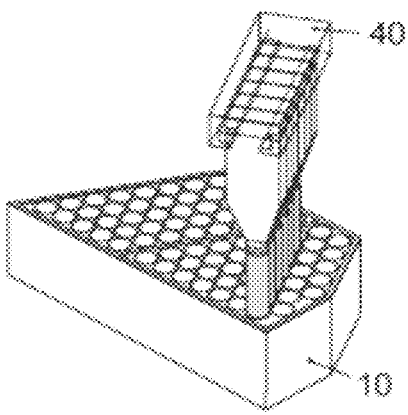
Figure 33:
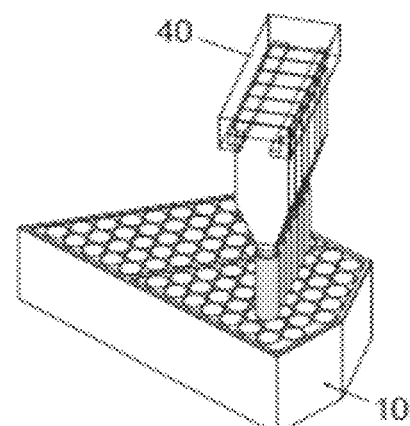

The end effector 40 can load battery cells 1 into the battery module 10 from a multitude of orientations. When the fingers 42 to 47 are collectively loaded with multiple battery cells, the orientation of the end effector 40 may be in general along one of the rows, column, or diagonals of the battery module 10 since these are the orientations in which the most battery cells can be placed simultaneously. FIGS. 31 to 33 show perspective views of the end effector 40 with all fingers holding battery cells as the end effector 40 approaches the battery module 10 and two different placement locations along a diagonal row. As noted above, the gaps between successive fingers may be different for unloading the battery cells in the battery module 10 than the gaps required for picking up the battery cells from the test fixture 30. Changing the gaps between the fingers may occur while the robot and the end effector 40 move from the test fixture 30 to the correct orientation above the battery module 10.

With the example embodiments described above, it is possible to handle and place multiple battery cells simultaneously at high speed with the multiple fingers 42 to 47. Furthermore, the example embodiments above provide the ability to handle battery cells that are in the battery cell voltage test fixture that have a close generally identical separation and the ability to position the battery cells at whatever gap spacing it required in the battery module including nonidentical spacing between the battery cells and thus the fingers. Furthermore, it is possible to selectively pick up only good cells for loading while leaving bad cells for quality control disposition separately. According to the above-described example embodiments, the battery cells may be handled in very close proximity from only the negative end without having to grip or grab on the sides. This is a critical capability when battery cells are presented closely together for loading or if the gap between battery cells in the battery module is very small since collision of a gripper with other battery cells or the frame wall can have serious adverse consequences, for example shorts, fires, cells falling over and so on. Furthermore, the battery cells may be loaded in multiple zones simultaneously.

While exemplary embodiments have been described above, various modifications may be implemented. For example, instead of picking up the battery cells with magnetic force, the battery cells may be picked up with suction.

What is claimed is:

1. A test fixture for testing a plurality of longitudinal battery cells, comprising:
    a base plate;
    a plurality of holding structures adapted to hold the battery cells, the holding structures being mounted on the base plate and configured to hold the battery cells with their longitudinal axes being perpendicular with respect to the base plate; and
    a plurality of contacts arranged on the base plate to electrically contact positive and negative terminals of each of the battery cells.

2. The test fixture according to claim 1, wherein the plurality of holding structures includes a plurality of pins arranged perpendicular with respect to the base plate.

3. The test fixture according to claim 2, wherein the pins are arranged in a matrix, and wherein each battery cell is contacted and held by four pins arranged in a rectangular pattern.

4. The test fixture according to claim 1, wherein the plurality of contacts include for each battery cell a first electrical pin configured to contact a contact of the battery cell protruding from a center of an end face of the battery cell, and a second electrical pin configured to contact a contact lip of the battery cell extending from a cylindrical lateral surface of the battery cell on a side of the end face.

5. The test fixture according to claim 1, further comprising a connector adapted to electrically couple the plurality of contacts of the test fixture to a test circuit to test a voltage of the battery cells.

6. The test fixture according to claim 1, wherein the holding structures of the test fixture are configured to be inserted into gaps between the battery cells, when the plurality of battery cells are arranged in a delivery packaging with their longitudinal axes being arranged in parallel.

7. An effector for engaging and disengaging a plurality of longitudinal battery cells, comprising:
    a holder device;
    a plurality of effector units arranged at the holder device, each of the effector units being configured to selectively engage and disengage one of the plurality of battery cells; and
    a distance control unit coupled to the plurality of effector units, the distance control unit being configured to selectively control a distance between the effector units.

8. The effector according to claim 7, wherein the effector units are arranged linearly at the holder device, wherein the distance control unit is configured to selectively linearly displace the effector units in order to selectively control the distance between neighboring effector units.

9. The effector according to claim 7, further comprising a rotary unit coupled to the holder device, the rotary unit being adapted to rotate the holder device together with the plurality of effector units.

10. The effector according to claim 7, wherein each effector unit includes an electromagnet configured to selectively engage and disengage a contact area of the electromagnet with a magnetic end face of one of the plurality of battery cells by selectively actuating the electromagnet.

11. The effector according to claim 7, wherein each effector unit includes a suction area configured to selectively engage and disengage the suction area with an end face of one of the plurality of battery cells by activation and deactivation of suction, respectively.

12. The effector according to claim 7, wherein each effector unit includes a permanent magnet configured to engage a contact area of the permanent magnet with a magnetic end face of one of the plurality of battery cells, and an ejector device configured to disengage said one of the plurality of battery cells.

13. The effector according to claim 12, wherein the ejector device includes an ejector pin configured to be selectively extended beyond the contact area of the permanent magnet.

14. The effector according to claim 12, wherein the ejector device includes an air pressure outlet in the contact area of the permanent magnet.

15. The effector according to claim 7, wherein a contact area of the effector unit where the effector unit contacts an end face of the one of the plurality of the battery cells is smaller than a corresponding contact area of the one of the plurality of the battery cells.

16. A system for assembling a battery module, the battery module including a plurality of longitudinal battery cells, the system comprising:
    a test fixture adapted to test at least a part of the plurality of battery cells; and
    an effector adapted to transfer at least a part of the plurality of battery cells from the test fixture into the battery module;
    wherein the test fixture includes:
        a base plate;
        a plurality of holding structures adapted to hold the battery cells, the holding structures being mounted on the base plate and configured to hold the battery cells with their longitudinal axes being perpendicular with respect to the base plate; and
        a plurality of contacts arranged on the base plate to electrically contact positive and negative terminals of each of the battery cells; and
    wherein the effector includes:
        a holder device;
        a plurality of effector units arranged on the holder device, each of the effector units being configured to selectively engage and disengage one of the plurality of battery cells; and
        a distance control unit coupled to the plurality of effector units, the distance control unit being configured to selectively control a distance between the effector units.

17. The system according to claim 16, wherein the battery module includes a plurality of receiving locations adapted to receive the plurality of battery cells, the system further comprising a monitoring device configured to monitor at least one of the receiving locations and to determine, if the at least one receiving location is empty or if a battery cell is inserted in the at least one receiving location.

18. The system according to claim 17, wherein the monitoring device includes at least one of (a) a camera, (b) a laser sensor, (c) an ultrasonic sensor, and (d) a weight sensor.

19. A method for manufacturing a battery module, the battery module including a battery module frame for receiving a plurality of longitudinal battery cells, the method comprising:
    automatically picking up a plurality of battery cells from a delivery packaging of the battery cells using a test fixture;
    automatically testing a voltage of each of the plurality of picked up battery cells in the test fixture; and automatically transferring battery cells based on a result of the testing from the test fixture to the battery module frame using an effector.

20. The method according to claim 19, wherein the plurality of battery cells are arranged in the delivery packaging with their longitudinal axes being arranged in parallel, wherein the picking up the plurality of battery cells from the delivery packaging includes:
inserting holding structures arranged on a base plate of the test fixture into gaps between the battery cells in the delivery packaging from the top;
turning the test fixture together with the battery cells and the delivery packaging such that the battery cells are held by the holding structures and the base plate; and
removing the delivery packaging.

21. The method according to claim 19, wherein the transferring the battery cells from the test fixture to the battery module includes:
automatically identifying the battery cells which fulfilled a pass criterion in the testing;
engaging the battery cells with the effector, the effector including a holder device and a plurality of effector units arranged at the holder device, each of the effector units selectively engages one of the plurality of battery cells;
removing the engaged battery cells from the test fixture by lifting the effector;
adjusting a distance between the effector units according to a distance between receiving openings for the battery cells in the battery module frame;
transferring and inserting the battery cells in the battery module frame; and
disengaging the effector units from the battery cells.

22. The method according to claim 19, further comprising automatically transferring battery cells which did not pass the voltage test from the test fixture to a quality control disposition area.

23. The method according to claim 19, wherein the battery module frame includes a plurality of receiving locations adapted to receive the plurality of battery cells, the method further comprising automatically monitoring at least one of the receiving locations and determining, if the at least one receiving location is empty or if a battery cell is inserted in the at least one receiving location.

* * * * *